3,650,967
ENZYMATIC GRANULES
Wade A. Johnson, Highland Park, N.J., assignor to
Colgate-Palmolive Company, New York, N.Y.
No Drawing. Filed Sept. 15, 1969, Ser. No. 858,106
Int. Cl. C11d 3/12, 1/86; C12k 1/08
U.S. Cl. 252—135
20 Claims

ABSTRACT OF THE DISCLOSURE

The malodor of granules formed from enzyme and a powdered hydratable mineral salt in the presence of water is minimized and substantially removed by incorporating into the granules an inorganic colloidal mineral material. Examples of such materials include colloidal silica, colloidal magnesium silicate and colloidal alumino-silicates.

This invention relates to granular enzyme-containing composition particularly characterized by the substantial absence of poor odor.

Powdered enzymes have been employed in pre-soak and washing detergent compositions, since they are particularly effective against various common stains which are fixed to textiles and laundry. In particular, proteolytic enzymes, which possess the ability to digest and degrade protein matter, are effective in removing from textiles and laundry protein stains such as blood, sweat, milk, cocoa, gravy and other sauces and the like. This digestion or degradation of protein matter facilitates removed of dirt by the detergent. Amylases and lipases are also useful in detergent cleaning.

However, the use of powdered enzymes in such compositions has resulted in certain problems, including the presence of an excessive amount of dust. Furthermore, detergent compositions containing enzymes have been subject to discoloration, formation of undesirable odor, and caking.

To obviate or minimize the dust problem and other problems, it has been suggested to graulate the various compounds which are common builder salts in their hydratable form with enzymes. Generally this is done by contacting enzyme with an anhydrous or hydrated salt and adding water or a solution of a surfactant such as a nonionic surfactant or of a binding agent such as dextrin, gelatin, alkali metal silicate, alkali metal carboxymethyl cellulose or polyvinyl alcohol.

When the salt in the granulate is substantially hydrated, that is when the amount of hydration of the salt is greater than about 80% of the theoretical amount of hydration, the granules typically possess a characteristic malodor which may remain with them until they are used in a soaking or washing process.

It is an object of the invention to provide an enzymatic granulate containing powdered enzyme and substantially hydrate builder salt in which the malodor of the granules is substantially eliminated. Other objects will be apparent from the following description.

In accordance with certain of its aspects, this invention relates to an enzymatic granulate product consisting essentially of about 2–50% by weight of enzyme preparation on a solids basis, about 20–98% by weight of hydrated water-soluble builder salt on a solids basis, said builder salt containing at least about 80% of the theoretical maximum amount of water of hydration, and about 1–40% by weight of an inorganic colloidal mineral material containing silicon.

In accordance with certain other of its aspects, this invention relates to a process of producing a granular enzymatic product which comprises granulating particulate enzyme with particulate builder salt in the presence of water to obtain a granulate in which the builder salt is at least 80% hydrated based on the theoretical amount of water in the completely hydrated salt and incorporating in said product an inorganic colloidal mineral material containing silicon.

The mixing period during the granulation step is variable and should be integrated with the proportion of the builder salt and the enzyme preparation, the degree of hydration of the salt, the amount of water used, the amount of colloidal mineral material used if the colloidal mineral material is present during the granulation and not post added) and the degree of mixing. Generally, a mixing period of about two to ten minutes, preferably three to five minutes, is employed to substantially homogeneously disperse the components of the granule and thereby produce a substantially dry enzymatic granule of desirable particle size.

The process of the invention may be carried out by premixing the enzyme preparation, builder salt and (if present during the granulation step) the colloidal mineral material in a powder mixer and granulating the premix in a granulating mixer with agitation, or by simultaneously adding these components and water or water solution to the granulating mixer or by slurrying the enzyme with water or solution, adding colloidal mineral material to the slurry (if present during the granulation step) and then adding builder salt. The granulating mixer may be the well-known Hobart mixer (whose mixing blade rotates about the blade axis and also moves in a circular path about the axis of the mixing vessel and close to the cylindrical internal wall of the mixing vessel) which has given smaller beads than the use of a conventional Day mixer (whose helical mixing blade also moves in a circular path about the axis of the mixing vessel and close to its cylindrical internal wall, but does not rotate about the blade axis). Another granulating mixer which may be used is the Patterson & Kelley Twin-Shell Blender (whose mixing action is achieved by rotating the V-shaped vessel around a horizontal axis to obtain a dispersion of the water throughout the moving mixture of the enzyme, salt and, if present, colloidal mineral material). Other suitable granulating mixers are the granulating pans traditionally used by the pharmaceutical industry and the granulating drums used in the preparation of granular fertilizers. A preferred type of mixer is the fluidized feed mixer sold by Gebrüden (Germany). Preferably, the process is carried out in such fashion as to produce beads or granules which pass through a ten mesh screen (screen opening of 2 mm.), more preferably through a 20 mesh screen (screen opening of 0.84 mm.), and are retained on an 80 mesh screen (screen opening of 0.177 mm.); the beads or granules within that size range being more preferably a major proportion (and being most preferably at least about 70%, e.g., about 70%–90% of the total weight of the product). All screen sizes used herein are U.S. Standard.

In the preferred form of the invention the enzyme comprises a proteolytic enzyme which is active upon protein matter and catalyzes digestion or degradation of such matter when present as in linen or fabric stain in a hydrolysis reaction. Generally, the enzymes are effective in a pH range of about 4–12, and are effective even at moderately high use temperatures. They are also effective at ambient temperature and temperatures of about 10° C. Particular examples of proteolytic enzymes which may be used in the instant invention include pepsin, trypsin, chymotrypsin, papin, bromilin, colleginase, keratinase, carboxylase, amino peptidase, elastase, subtilisin and aspergillopeptidase A and B. Preferred enzymes are subtilisin enzymes manufactured and cultured from special strains of spore forming bacteria, particularly *Bacillus subtilis*.

Proteolytic enzymes such as Alcalase (1.5 and 4.0 Anson units), Maxatase, 300,000, 330,000 and 500,00, Protease AP 10X, Protease ATP 40, Potease ATP 120, Protease L-252, Protease L-423, Proteinase ATP 360, Alkaline Protease No. 1, Proteinase GV, Protease 2200 C, Protease A 300, Protein AS 7, Enzyme P and Bioprase AL 15 are among those enzymes derived from strains of spore forming Bacillus, such as *Bacillus subtillis*.

Different proteolytic enzymes have different (degrees of effectiveness in aiding in the removal of stains from textiles and linen. Particularly preferred as stain removing enzymes are subtilisin enzymes.

Metalloproteases which contain divalent ions such as calcium, magnesium or zinc bound to their protein chains are also of interest.

The enzyme preparations are generally extremely fine powders. In a typical powdered enzyme preparation the particle diameter generally ranges from 0.01 mm. to 0.15 mm. e.g. about 0.1 mm., and as much as 75% of the material may pass through a 100 mesh (U.S. Standard) sieve. On the other hand the spray dried granules are usually of very much larger particle size, with the major portion of the granules being from about 0.2 mm. to 2.0 mm. in diameter.

The enzyme preparations are generally diluted with inorganic salts, e.g., alkali metal and alkaline earth metal salts. Typically the enzyme comprises from 1% to 80% by weight of the enzyme preparation. For example, a typical Alcalase enzyme material analyzes (by weight) 6.5% enzyme, 4% water, 70% sodium chloride. 15.5% sodium sulfate, 3.5% calcium sulfate, and 0.5% organic impurities. Chemically they are typically stable in the pH range of 5 to 10, particularly at an alkaline pH of 8.0 to 9. Generally, they are effective against various types of soil in an aqueous medium having a temperature of about 20° C. to about 80° C. Naturally, different proteolytic enzymes have different degrees of effectiveness in aiding in the removal of specific stains from textiles and linen.

Instead of, or in addition to, the proteolytic enzyme, an amylase may be present such as a bacterial amylase of the alpha type (e.g. obtained by fementation of *B. subtilis*). One very suitable enzyme mixture contains both a bacterial amylase of the alpha type and an alkaline protease, preferably in proportions to supply about 100,000 to 400,000 Novo alpha-amylase units per Anson unit of said alkaline protease.

On a solids basis, i.e., a water-free basis, the enzyme preparation content of the granules or beads can be varied widely and generally will be in the range of 2% to 50% by weight of enzyme preparation or 0.1% to 4% by weight of active enzyme. When the particulate enzyme preparation has an alkaline protease content of 1.5 Anson units per gram, this range of course represents some 3 to 75 Anson units per 100 grams of granules or beads. The invention finds its greatest utility, however, for the manufacture of granules or beads which are relatively high in enzyme preparation content, containing at least 8% by weight of the enzyme preparation (corresponding to, say, at least 12 Anson units per 100 grams of the granules) and preferably at least 10% by weight. In the final washing product, made for example by blending the enzyme containing granules or beads with other granular material (such as spray-dried hollow beads or spongeous low density granules), the content of powdered enzyme preparation is much lower, e.g., in the range of about 0.1% to 4.0%, preferably about 0.3% to 2.0%.

Generally, the water-soluble builder salts used in the process of this invention provide a pH in the range of 4 to 12, preferably in the range of 7 to 11. They may be anhydrous, partially hydrated, or completely hydrated. Preferably they are not completely hydrated prior to being granulated and most preferably they are anhydrous. The water-soluble builder salt component may be an anhydrous or hydrated single salt, a mixture of hydratable, water-soluble builder salts, or a portion of a multi-component detergent granule.

The particles of builder salt which are mixed with the powdered enzyme generally range in particle size from about 0.044 mm. to about 3.36 mm., i.e., correspond to a range of —6 mesh to +325 mesh (U.S. sieve standard). Since these salts contain more fines than the typical spray dried detergent products which range from about 0.2 mm. to 2.0 mm. they are more prone to dust. Therefore, the preferred size range of the builder salt is 0.2 mm. to 2.0 mm., with a preferred density range of 0.2 to 1.0 gram/cc.

Typical examples of organic builder salts which may be employed alone or in the aforementioned admixtures include the trisodium salt of nitrilotriacetic acid and the di-, tri- and tetrasodium salts of ethylene-diamine tetraacetic acid. Preferred inorganic builder salts are the hydratable alkali metal polyphosphate salts which have the property of inhibiting precipitation of calcium and magnesium material in aqueous solution and of contributing to the heavy-duty performance of the detergent product. They may be considered as derived from orthophosphoric acid or the like by the removal of molecularly-bound water, though any suitable means of manufacture may be employed if desired. Such complex or molecularly dehydrated polyphosphate salts may be used in the form of the normal or completely neutralized salt, e.g., pentapotassium tripolyphosphate, pentasodium tripolyphosphate, and potassium acid tripolyphosphate. The alkali metal salts of tetraphosphoric acid may be used also. The alkali metal polyphosphate salts may be used in anhydrous or hydrated form.

Other alkaline builder salts may be employed also, such as the soluble alkali metal borates, sulfates, carbonates, and silicates. Usually, the silicates will be employed in suitable combination with other builder salts such as the polyphosphates. Suitable silicates are those available in solid form and having an alkali oxide to silicon dioxide ratio within the range of about 1:1 to 1:4, and preferably from about 1:2 to 1:3. Examples are sodium silicates having an $Na_2O$ to $SiO_2$ ratio of 1:2.35, 1:2.5, 1:3.2, 1:2.0, 1:1.6 and 1:1. The most highly preferred builder salt is anhydrous sodium tripolyphosphate.

The hydratable builder salt content of the granulate of the invention can be varied widely, for example, in the range of about 20–98% by weight of the granulate on a solids basis, i.e., a water free basis. Typically, it is present in the range of about 40–90% by weight on a solids basis.

The mount of builder salt is expressed as a solids basis because the amount of water present varies with the identity and the amount of each particular hydratable builder salt. For example, 0.294 part by weight of water are required for each part of anhydrous sodium tripolyphosphate if the stable sodium tripolyphosphate hexahydrate is formed. For this reason, the granulate composition containing enzyme preparation attached to a hydrated water-soluble builder salt which is hydrated to the extent of at least 80% by weight of the theoretical amount of water in the completely hydrated salt is specified as containing (a) about 2–50% by weight of enzyme preparation on a solids basis, (b) about 20–98% of the builder salt on a solids basis, and (c) water. When the builder salt employed is less than 80% hydrated, the water is present in at least an amount which hydrates the builder salt to the extent of at least about 80% by weight of the theoretical amount necessary to completely hydrate the salt. When the builder salt is hydrated during contact with water preferably the maximum amount of water employed would not be substantially in excess of the amount necessary to completely hydrate the salt.

The granulation may be carried out in the presence of water or a water solution of ingredients such as a surfactant (e.g., a nonionic surfactant) and/or a binding agent (e.g., dextrin, gelatin, alkali metal silicate, alkali metal carboxymethyl cellulose, or polyvinyl alcohol). When present, the surfactants and binding agents provide desirable features to the granulate, such as providing a granulate which is relatively uniform in size, and is less prone to dust.

The surfactant which is dissolved in the water used in granulation may be an anionic surfactant such as a higher alkyl benzene sulfonate containing 10 to 16 carbon atoms in the alkyl groups,, or an amphoteric surfactant such as an alkyl beta-amino propionate or a nonionic surfactant. The nonionic surfactants are preferred.

The nonionic synthetic organic detergents are generally the condensation product of an organic aliphatic or alkyl aromatic hydrophobic compound and hydrophilic ethylene oxide groups. Practically any hydrophobic compound having a carboxy, amido, or amino group with a free hydrogen attached to the nitrogen can be condensed with ethylene oxide to form a nonionic detergent. Further, the length of the polyethaneoxy chain can be adjusted to achieve the desired balance between the hydrophobic and hydrophilic elements.

The nonionic detergents include the polyethylene oxide condensate of one mole of alkyl phenol containing from about 6 to about 12 carbon atoms in a straight or branched chain configuration with about 5 to 30 moles of ethylene oxide, e.g., nonyl phenol condensed with 9 moles of ethylene oxide, dodecyl phenol condensed with 15 moles of ethylene oxide and dinonyl phenol condensed with 15 moles of ethylene oxide. Condensation products of the corresponding alkyl thiophenols with 6 to 30 moles of ethylene oxide are also suitable.

Also included in the nonionic detergent class are the condensation products of a higher alcohol containing about 8 to 22 carbon atoms in a straight or branched chain configuration condensed with about 5 to 30 moles of ethylene oxide, e.g., lauryl-myristyl alcohol condensed with about 16 moles of ethylene oxide.

Another well known class of nonionic detergents is the condensation product of ethylene oxide on a hydrophobic base formed by the condensation of propylene oxide and propylene glycol. These materials are sold under the trade name "Pluronic." The molecular weight of the hydrophobe ranges from about 1,500 to 1,800 and the polyethylene oxide content may comprise up to 50% of the total weight of the condensate.

Other nonionic detergents include the ethylene oxide addends of monoesters of hexahydric alcohols and inner ethers thereof with higher fatty acids containing about 10 to 20 carbon atoms, e.g., sorbitan mono-laurate, sorbitan mono-oleate, and mannitan monopalmitate.

The surfactant may be dissolved in the water used in granulation in amount of about 1–25% by weight on a solids basis, preferably about 2–20% and most preferably about 2.5–5%.

Binding agents such as dextrin, gelatin, alkali metal silicate (e.g., sodium silicate), alkali metal carboxy methyl cellulose (e.g., sodium carboxy methyl cellulose) and polyvinyl alcohol may also be dissolved in the water used for granulation, in amount of about 1–25% by weight on a solids basis, preferably about 2–20% and most preferably about 2.5–5%.

The inorganic colloidal mineral material employed to substantially remove malodor from the granulate material may be mixed with the enzyme, hydratable builder salt and water or solution during granulation, or may be post-added to the formed granulate. The colloidal mineral materials which are particularly useful in the instant invention contain silicon and include natural and synthetic colloidal precipitated silica, colloidal silicates, such as magnesium silicate ($MgO:SiO_2 = 1:1$ to $1:3$), colloidal alumino-silicates such as hydrogen alumino-silicate and sodium alumino-silicate, sodium magnesium silicate, mixtures of colloidal silica and barium sulfate and modified clays, such as bentonite. Silica and bentonite are preferred. When present during the granulation step, the colloidal mineral compounds is typically present in amount of about 1–40%, preferably about 5–30% on a solids basis. When post-added to the formed granule, the colloidal mineral salt is typically incorporated into the granule in amounts of about 1–15% by weight of the granule.

The enzyme-containing granulate produced in accordance with this invention may appear in a wide variety of washing products. For example, the granulate may be incorporated in a laundry presoak product or in a laundry detergent or in a dishwashing product. The granulate may be used as a laundry presoak product or it may be admixed with additional builders and a small amount of organic detergent to form a laundry presoak product. A typical presoak product contains a relatively high concentration of builder salt such as about 30 to 95% pentasodium tripolyphosphate (calculated as anhydrous pentasodium tripolyphosphate), about 2 to 10% of organic surface active detergent, plus other ingredients such as sodium silicate (which acts as a builder salt and also acts to inhibit corrosion of aluminum surfaces), brightening agents and sodium sulfate. A laundry detergent generally has a lower ratio of builder salt to organic surface active agent (e.g., a ratio in the range of about 1:1 to 10:1 and preferably in the range of 2:1–6:1). On the other hand, dishwashing products designed for use in automatic dishwashers are usually more alkaline, containing a very high proportion of alkaline builder salt, such as a mixture of the pentasodium tripolyphosphate and sodium silicate; they contain little, if any, organic surface active detergent, e.g., about 0.2 to 3%. Usually, automatic dishwashing compositions contain a minor proportion (e.g., 0.5 to 5% of an agent to prevent water-spotting such as a dry water-soluble compound which on contact with water liberates hypochlorite chlorine (e.g., a heterocyclic dichloroisocyanurate); alternatively, a chlorinated phosphate (such as the well known chlorinated trisodium phosphate) may be used to supply both hypochlorite chloride and some phosphate.

In formulating the washing products, the water-soluble builder salts usually employed are the phosphates and particularly condensed phosphates (e.g., pyrophosphates or tripolyphosphates), silicates, borates and carbonates (including bicarbonates), as well as organic builders such as salts of nitrilotriacetic acid or ethylene diamine tetraacetic acid. Sodium and potassium salts are preferred. Specific examples are sodium tripolyphosphate, potassium pyrophosphate, sodium hexametaphosphate, sodium carbonate, sodium bicarbonate, sodium sesquicarbonate, sodium tetraborate, sodium silicate, salts (e.g., Na salt) of methylene diphosphonic acid, disodium diglycollate, trisodium nitrilotriacetate or mixtures of such builders, including mixtures of pentasodium tripolyphosphate and trisodium nitrilotriacetate in a ratio, of these two builders, of 1:10 to 10:1, e.g. 1:1.

The organic surface active component of the aforementioned washing products may be an anionic, nonionic or amphoteric surface active compound or a mixture of two or more of the foregoing agents may be used.

The anionic surface active agents include those surface active or detergent compounds which contain an organic hydrophobic group and an anionic solubilizing group in their molecular structure. Typical examples of anionic solubilizing groups are sulfonate, sulfate, carboxylate, phosphonate and phosphate.

Examples of suitable anionic detergents which fall within the scope of the anionic detergent class include the water-soluble salts, e.g., the sodium, ammonium, and alkylolammonium salts, of higher fatty acids or resin acids containing about 8 to 24 carbon atoms, preferably 10 to 20 carbon atoms. Suitable fatty acids can be obtained from oils and waxes of animal or vegetable origin, e.g., tallow, grease, coconut oil and tallow, e.g., sodium coconut soap and potassium tallow soap.

The anionic class of detergents also includes the water-soluble sulfated and sulfonated synthetic detergents having a alkyl radical of 8 to 26, and preferably about 12 to 22 carbon atoms, in their molecular structure. (The term alkyl includes the alkyl portion of the higher acyl radicals.)

Examples of the sulfonated anionic detergents are the higher alkyl mononuclear aromatic sulfonates such as the higher alkyl benzene sulfonates containing from 10 to 16 carbon atoms in the alkyl group in a straight or branched chain, e.g., the sodium, potassium and ammonium salts of higher alkyl benzene sulfonates, higher alkyl toluene sulfonates, higher alkyl phenol sulfonates, and higher alkyl naphthalene sulfonates. A preferred sulfonate is a linear alkyl benzene sulfonate having a high content of 3- (or higher) phenyl isomers and a correspondingly low content (well below 50%) of 2- (or lower) phenyl isomers, i.e., wherein the benzene ring preferably attached in large part at the 3 or higher (e.g., 4, 5, 6 or 7) position of the alkyl group and the content of isomers in which the benzene ring is attached at the 2 or 1 position is correspondingly low.

Other suitable anionic detergents are the olefin sulfonates, including long chain alkene sulfonates, long chain hydroxyalkane sulfonates or mixtures of alkenesulfonates and hydroxyalkane-sulfonates. These olefin sulfonate detergents may be prepared in a known manner by the reaction of $SO_3$ with the long chain olefins containing 8 to 25, preferably 12–21 carbon atoms and having the formula $RCH=CHR_1$ where R is a higher alkyl group of 6 to 23 carbons and $R_1$ is an alkyl group of 1 to 17 carbons or hydrogen to form a mixture of sultones and alkenesulfonic acids which is then treated to convert the sultones to sulfonates. Other examples of sulfate or sulfonate detergents are paraffin sulfonates containing about 10–20, preferably about 15–20, carbon atoms, e.g., the primary paraffin sulfonates made by reacting long chain alpha olefins and bisulfites and paraffin sulfonates having the sulfonate groups distributed along the paraffin chain; sodium and potassium sulfates of higher alcohols containing 8 to 18 carbon atoms such as sodium lauryl sulfate and sodium tallow alcohol sulfate; sodium and potassium salts of α-sulfofatty acid esters containing about 10 to 20 carbon atoms, e.g., methyl α-sulfomyristate and methyl α-sulfotallowate; ammonium sulfates of mono- or di-glycerides of higher fatty acids, e.g., stearic monoglyceride monosulfate; sodium and alkylolammonium salts of alkyl polyethenoxy ether sulfates produced by condensing 1 to 5 moles of ethylene oxide with one mole of higher ($C_8$–$C_{18}$) alcohol; sodium higher alkyl glyceryl ether sulfonates; and sodium or potassium alkyl phenol polyethenoxy ether sulfates with about 1 to 6 oxyethylene groups per molecule and in which the alkyl radicals contain about 8 to about 12 carbon atoms.

The suitable anionic detergents include also the acyl sarcosinates (e.g., sodium lauroylsarcosinate), sodium and potassium salts of the reaction product of higher fatty acids containing 8 to 18 carbon atoms in the molecule esterified with isethionic acid, and sodium and potassium salts of the higher fatty acid amide of methyl taurine, e.g., sodium cocoyl methyl taurate and sodium stearoyl methyl taurate.

Anionic phosphate surfactants in which the anionic solubilizing group attached to the hydrophobic group is an oxyacid of phosphorous are also useful in the detergent compositions. Suitable phosphate surfactants are the sodium, potassium and ammonium alkyl phosphate centers such as $(R-O)_2PO_2M$ and $ROPO_3M_2$ in which R represents an alkyl chain containing from about 8 to about 20 carbon atoms or an alkyl phenyl group having 8 to 20 carbon atoms and M represents a soluble cation. The compounds formed by including about one to 40 moles of ethylene oxide in the foregoing esters, e.g., $[R-O-(EtO)_n]2PO_2M$, are also satisfactory.

The particular anionic detergent salt will be suitably selected depending upon the particular formulation and the proportions therein. Preferred salts include the ammonium, substituted ammonium (mono-, di- and triethanolammonium), alkali metal (such as sodium and potassium) and alkaline earth metal (such as calcium and magnesium) salts of the higher alkyl benzene sulfonates, olefin sulfonates, the higher alkyl sulfates, and the higher fatty acid monoglyceride sulfates.

The nonionic synthetic organic detergents or surfactants correspond to those described above, which may also be dissolved in the water used in granulation.

The amphoteric detergents which can be used in the compositions of this invention are generally water-soluble salts of derivatives of aliphatic amines which contain at least one alkyl group of about 8 to 20 carbon atoms and an anionic water solubilizing carboxyl, sulfo or sulfato group in their molecule.

The suitable ampholytic or amphoteric detergents which can be used in the compositions of this invention generally contain a hydrophobic alkyl group of about 8 to 18 carbon atoms, at least one anionic water-solubilizing group, e.g., carboxy, sulfo, sulfato, phosphato, or phosphono, and at least one cationic group, e.g., non-quaternary nitrogen, quaternary ammonium, or quaternary phosphonium group, in their molecular structure. The alkyl group may be straight chain or branched and the specific cationic atom may be part of a heterocyclic ring.

Examples of suitable ampholytic detergents include the alkyl betaaminopropionates, $RN(H) C_2H_4COOM$; the alkyl betaiminodipropionates, $RN(C_2H_4COOM)_2$; and the long chain imidazole derivatives having the following formula:

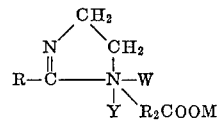

wherein R is an alkyl group of about 8 to 18 carbon atoms, W is selected from the group of $R_2OH$, $R_2OM$ and $R_2OR_2COOM$, Y is selected from the group consisting of OH, $R_3SO_3^-$ and $R_3OSO_3^-$, $R_2$ is an alkylene or hydroxyalkylene group containing 1 to 4 carbon atoms, $R_3$ is selected from the group consisting of alkyl, alkaryl, and fatty acyl glyceride groups having 6 to 18 carbon atoms in the alkyl or an acyl group, and M is a water-soluble cation, e.g., alkali metal, ammonium or alkylolammonium. Preferred detergents are sodium N-lauryl betaaminopropionate, disodium N-lauryl iminodipropionate, and the disodium salt of 2-lauryl-cycloimidium-1-hydroxyl, 1-, ethoxyethanoic acid, 1-ethanoic acid. Other imidazole detergents are described in U.S. 2,773,608; U.S. 2,781,354; and U.S. 2,781,357.

Other suitable amphoteric detergents are the sultaine and betaine types having the following general structure:

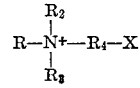

wherein R is an alkyl group containing about 8 to 18 carbon atoms, $R_2$ and $R_3$ are lower alkyl groups containing 1 to 3 carbon atoms, $R_4$ is an alkylene or hydroxyalkylene group containing about 1 to 4 carbon atoms, and X is an anion selected from the group consisting of $SO_3^=$ (sultaine) and $COO^=$ (betaine). Preferred compounds are 1-(myristyl dimethylammonio) acetate and 1-(myristyl dimethylammonio)-2-hydroxypropane-3-sulfonate.

Another class of suitable amphoteric detergents is the amphoteric imidazoline having the following structure:

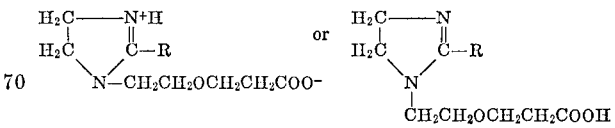

wherein R is a higher acyclic group of 7 to 17 carbon atoms. The acyclic groups may be derived from coconut oil fatty acids (a mixture of fatty acids containing 8 to 18 carbon atoms), lauric fatty acid, and oleic fatty acid and the preferred groups are $C_7$–$C_{17}$ alkyl groups.

Various other materials may be present in the washing products. Thus, materials such as the higher fatty acid amides may be added to improve detergency and modify the foaming properties in a desirable manner. Examples thereof are the higher fatty acid alkanolamides, preferably having 2–3 carbons in each alkanol group attached to a fatty acyl radical containing 10–18 carbons (preferably 10–14 carbons), such as lauric or myristic monoethanolamides, diethanolamides and isopropanolamides.

Other suitable foam builders are the tertiary amine oxides of the general formula $R_1R_2R_3N \rightarrow O$ wherein R is an alkyl radical of about 10 to 18 carbon atoms, $R_2$ and $R_3$ are alkyl or hydroxyalkyl groups containing 1 to 3 carbon atoms, and the arrow represents a semipolar bond. Included among the satisfactory amine oxides are lauryl dimethyl amine oxide and myristyl dimethyl amine oxide.

Fatty alcohols of 10–18 carbon atoms such a lauryl or coconut fatty alcohols, or cetyl alcohol are suitable additives also. A hydrotropic material such as the lower alkyl aryl sulfonates, e.g., sodium toluene or xylene sulfonates, can assist processing also. In general, these materials and the foregoing foam builders are added in minor amounts, usually from about ½ to 10%, preferably to 6%, based on the total solids.

The mixtures may also contain optical brightening agents or fluorescent dyes (e.g., amounts in the range of 1/20% to ½%); germicidal ingredients such as halogenated carbanilides, e.g., trichlorocarbanilide, halogenated salicylanilide, e.g., tribromosalicylanilide, halogenated bisphenols, e.g., hexachlorophene, halogenated trifluoromethyldiphenyl urea, zinc salt of 1-hydroxy-2-pyridine-thione and the like (e.g., in amounts in the range of about 1/50% to 2%); soil-suspending agents such as sodium carboxymethyl cellulose or polyvinyl alcohol, preferably both, or other soluble polymeric materials, such as methyl cellulose (the amount of suspending agent being in the range of about 1/20% to 2%); antioxidants such as 2,6-ditert-butylphenol or other phenolic antioxidant materials (e.g., in amounts in the range of about 0.001 to 0.1%); coloring agents; bleaching agents; and other additives.

A particularly suitable composition, for use as a granular detergent material contains builder salt such as sodium tripolyphosphate and a mixture of a linear alkylbenzenesulfonate, as previously described, soap and a nonionic detergent, with the soap and nonionic detergent being present in minor proportions. About 50 to 1000 parts by weight of builder salt are employed per 100 parts by weight of the mixture of linear alkylbenzenesulfonate although it may comprise a blend of the linear alkylbenzenesulfonate detergent with other anionic synthetic sulfate or sulfonate detergents (e.g., olefin sulfonates, paraffin sulfonates having the sulfonate groups distributed along the paraffin chain, or alkyl sulfates) with the alkylbenzenesulfonate constituting, say ⅓, ½ or ⅔ of this blend.

The following examples illustrate the invention. All parts and proportions are by weight unless otherwise indicated.

EXAMPLE 1

(A) 10 parts of subtilisin enzyme (Alcalase) are dry-mixed with 70 parts of anhydrous sodium tripolyphosphate. 20 parts of water are then sprayed on the mixture in a rotating drum thereby forming a granulate. A strong characteristic malodor evolves immediately.

(B) 5 parts of various colloidal silicas are added to the granulates of part A of this example. Malodors disappear in a few minutes. The following colloidal silicas are employed: (1) 99.8% $SiO_2$ and specific surface of 380±40 m.²/g.; (2) 99.8% $SiO_2$ and specific surface of 175±25 m.²/g.; (3) 87% $SiO_2$, specific surface of 240 m.²/g. and moisture content of about 6%.

(C) 10 parts of colloidal magnesium silicate (having an MgO:$SiO_2$: $H_2O$ ratio of 1:25:1.5 and a specific surface of 500 m.²/g.) are added to the granulate of part A of the example. The malodor again disappears.

EXAMPLE 2

(A) 10 parts of the subtilisin enzyme of Example 1 are admixed with 60 parts of anhydrous sodium tripolyphosphate, and 10 parts of colloidal magnesium silicate. 20 parts of water are then sprayed on the mixture in a rotating drum. No substantial development of malodor occurs.

(B) Part A of this example is modified using 5 parts of colloidal silica in place of 10 parts of colloidal magnesium silicate and the amount of anhydrous sodium tripolyphosphate is increased to 65 parts. No substantial development of malodor occurs.

EXAMPLE 3

(A) 10 parts of the subtilisin enzyme of Example 1 are dry-mixed with 69.6 parts of anhydrous sodium tripolyphosphate and 0.4 parts of sodium carboxymethyl cellulose. 20 parts of water are sprayed on this mixture in a rotating drum, thereby forming a granulate. A strong characteristic malodor evolves immediately.

(B) 10 parts of the subtilisin enzyme of Example 1 are dry-mixed with 68 parts of anhydrous sodium tripolyphosphate, and 2.5 parts of nonyl phenol ethoxylated with 9 mols of ethylene oxide per mol of nonylphenol. 19.5 parts of water are sprayed on this mixture as in part A of this example. The same characteristic malodor evolves immediately.

(C) To the granules obtained according to parts A and B of this example are added:

(1) 5 parts of a colloidal silica (which is 99.8% $SiO_2$ and has a specific surface of 380±40 m.²/g.);
(2) 5 parts of another colloidal silica (which is 99.8% $SiO_2$ and has a specific surface of 175±25 m.²/g.);
(3) 5 parts of another colloidal silica (which is 87% $SiO_2$ and has a specific surface of 24 0m.²/g. and moisture contents of about 6%); and
(4) 10 parts of colloidal magnesium silicate (having an Mg:$SiO_2$:$H_2O$ ratio of 1:2.1:1.5 and a specific surface of 500 m.²/g.). In each case the malodor is substantially decreased.

EXAMPLE 4

(A) 10 parts of the subtilisin enzyme of Example 1 are admixed with 59.6 parts of anhydrous sodium tripolyphosphate, 0.4 part of sodium carboxymethyl cellulose and 10 parts of a colloidal magnesium silicate (having an MgO:$SiO_2$:$H_2O$ ratio of 1:2.1:1.5). Then 20 parts of water are sprayed as in Example 1 thereby forming a granulate. No substantial development of malodor occurs.

(B) 10 parts of colloidal magnesium trisilicate (ratio of MgO:$SiO_2$ of about 1:3) replace the magnesium silicate of part A of this example. Again no substantial development of malodor is noticed.

The subtilisin enzyme Alcalase used in the foregoing examples is characterized as having its maximum proteolytic activity at a pH of 8–10. This activity as measured on the commercial enzyme available from Novo Industri A/s, Copenhagen, Denmark, is about 1.5 Anson Units per gram of the enzyme. The commercial enzyme is a raw extract of *Bacillus subtilis* culture and contains about 6% of pure crystallized proteolytic material.

EXAMPLE 5

10 parts of a proteolytic enzyme (Maxatase 300,000) are dry-mixed with 58 parts of anhydrous sodium tripolyphosphate, 2.5 parts of ethoxylated (9.5) nonyl phenol and 10 parts of the colloidal magnesium silicate described in Example 4A. 19 parts of water are then sprayed on the mixture in a rotating drum thereby forming a granulate. No substantial development of malodor is noticed. Similarly, no substantial development of malodor is noticed when the colloidal magnesium trisilicate described in Example 4B replaces the colloidal magnesium silicate.

The enzyme Maxatase used in this example is characterized as having its greatest proteolytic activity at a pH of 9.5–10. This activity as measured on the commercial enzyme available from Royal Netherlands Fermentation Industries, Ltd., Delft, Holland, is about 300,000 Deft Units per gram of the enzyme (330,000 Delft Units are equivalent to 1.5 Anson Units). The commercial enzyme is a raw extract of a Bacillus culture.

EXAMPLE 6

(A) 10 parts of a proteolytic enzyme (Protease ATP 360) are admixed with 59.6 of anhydrous sodium tripolyphosphate, 0.4 part of sodium carboxymethyl cellulose and 10 parts of a colloidal silica having an $SiO_2$ content of 97% and a specific surface of 300 to 350 m.$^2$/g. 20 parts of water are then sprayed on the mixture in a rotating drum thereby forming a granulate. No substantial development of malodor is noticed.

(B) Similarly, no substantial development of malodor is noticed when 10 parts of colloidal silicas having (1) an $SiO_2$ content of 99.8% and a specific surface of 175±25 m.$^2$/g. and (2) an $SiO_2$ content of 99.8% and a specific surface of 380±40 m.$^2$/g. are substituted for the colloidal silica employed in part A of this example.

The enzyme Protease ATP 360 used in this example may be characterized as having its greatest proteolytic activity at an pH of 9.5–10.5. This activity as measured on the commercial enzyme available from Rapidase, Seclin, France is about 185,000 PCA units per gram of the enzyme (185,000 PCA units are equivalent to 1.5 Anson units). The commercial enzyme is a raw extract of a Bacillus culture.

EXAMPLE 7

(A) 10 parts of a proteolytic enzyme (Exzyme P) are dry-mixed with 58 parts of anhydrous sodium tripolyphosphate, 2.5 parts of ethoxylated (9.5) nonyl phenol and 10 parts of colloidal sodium alumino-silicate having an $SiO_2$ content of 75% and a specific surface of 220 m.$^2$/g. 20 parts of water are then sprayed on the mixture in a rotating drum thereby forming a granulate. No substantial development of malodor is noticed.

(B) Similarly, no substantial development of malodor is noticed when 10 parts of a mixture of colloidal silica and barium sulfate having an $SiO_2$ content of 70% are substituted for the colloidal sodium alumino-silicate of part A of this example.

(C) Similarly, no substantial development of malodor is noticed when 10 parts of a mixture of an inorganic colloidal modified clay, bentonite, are substituted for the colloidal sodium alumina-silicate of part A of this example.

(D) The enzyme, Exzyme P, used in this example is characterized as having its greatest proteolytic activity at a pH of 8–10. This activity as measured in the commercial enzyme available from Premier Malt, Milwaukee, Wis., U.S.A., is about 117,400 PV units per gram of the exzyme (113,600 PV units are equivalent to 1.5 Anson units). The commercial enzyme is a raw extract of a Bacillus culture and contains somewhat less than 10% of pure crystallized proteolytic material.

EXAMPLE 8

Five slurries of colloidal bentonite clay in water are formed, containing respectively 7%, 8%, 9%, 10%, and 11% of bentonite. Subtilisin enzyme calculated is added to the slurries to form pastes containing 25% of enzyme composition. Pentasodium tripolyphosphate is added to each paste to form granulates which respectively contain 70%, 69%, 68%, 67%, and 66% of the tripolyphosphate. No substantial malodor develops during and subsequent to drying of the granulate.

Similar results to those described in the above examples are obtained when hydrated sodium tripolyphosphate and other anhydrous builder salts replace sodium tripolyphosphate.

It will be apparent to one skilled in the art that various modifications of the above examples may be made thereto.

I claim:

1. An enzymatic granulate product consisting essentially of about 2–50% by weight on a solids basis of enzyme preparation containing an enzyme selected from the group consisting of a protease, an amylase and mixtures thereof, about 20–98% by weight on a solids basis of hydrated water-soluble builder salt, said builder salt containing at least about 80% of the theoretical maximum amount of water of hydration, and about 1–40% by weight of an inorganic colloidal mineral material containing silica selected from the group consisting of silica, magnesium silicate hydrogen alumino-silicate sodium alumino-silicate, sodium magnesium silicate, a mixture of silica and barium sulfate and bentonite.

2. The enzymatic granulate product of claim 1 wherein said inorganic colloidal mineral material is present in amount of about 5–30%.

3. The enzymatic granulate product of claim 1 wherein said inorganic colloidal mineral material is present in amount of about 1–15%.

4. The enzymatic granulate product of claim 1 wherein said inorganic colloidal mineral material is silica.

5. The enzymatic granulate product of claim 1 wherein said inorganic colloidal mineral material is bentonite.

6. The enzymatic granulate product of claim 1 wherein the amount of said colloidal bentonite is up to about 11%.

7. The enzymatic granulate product of claim 1 wherein said hydrated builder salt is sodium tripolyphosphate.

8. The enzymatic granulate product of claim 1 wherein said enzyme is a proteolytic enzyme.

9. The enzymatic granulate product of claim 1 wherein said product additionally contains about 1–25% binding ingredient selected from the group consisting of dextrin, gelatin, alkali metal silicate, alkali metal carboxymethyl cellulose, polyvinyl alcohol and mixtures thereof.

10. The enzymatic granulate product of claim 1 wherein said product additionally contains about 1–25% surfactant.

11. A process of producing a granular enzymatic product which comprises granulating particulate enzyme selected from the group consisting of a protease, an amylase and mixtures thereof with particulate builder salt in the presence of water to obtain a granulate in which the builder salt is at least 80% hydrated based on the theoretical amount of water in the completely hydrated salt and incorporating in said product about 1–40% by weight of an inorganic colloidal mineral containing silicon selected from the group consisting of silica, magnesium silicate, hydrogen alumina-silicate, sodium alumino-silicate, sodium magnesium silicate, a mixture of silica and barium sulfate and bentonite.

12. The process of producing the granular enzymatic product of claim 11 wherein said inorganic colloidal mineral material is premixed with said enzyme and said builder salt prior to granulation.

13. The process of producing the granular enzymatic product of claim 11 wherein said inorganic colloidal mineral material is silica.

14. The process of producing the granular enzymatic product of claim 11 wherein said inorganic colloidal mineral material is bentonite.

15. The process of producing the granular enzymatic product of claim 14 wherein the amount of said colloidal bentonite is up to about 11%.

16. The process of producing the enzymatic granulate product of claim 11 wherein said builder salt is anhydrous prior to granulation.

17. The process of producing the enzymatic granulate product of claim 16 wherein said builder is anhydrous sodium tripolyphosphate.

18. The process of producing the enzymatic granulate product of claim 11 wherein said enzyme is a proteolytic enzyme.

19. The process of producing the enzymatic granulate product of claim 11 wherein there is present in the water about 1-25% binding ingredient selected from the group consisting of dextrin, gelatin, alkali metal carboxymethyl cellulose, polyvinyl alcohol and mixtures thereof.

20. The process of producing the granular enzymatic product of claim 11 wherein said product additionally contains about 1-25% surfactant.

References Cited

UNITED STATES PATENTS

| | | | |
|---|---|---|---|
| 2,717,852 | 9/1955 | Stone | 195—17 |
| 923,850 | 6/1909 | Kayser | 252—135 |
| 1,968,752 | 7/1934 | Evans | 252—135 |
| 2,110,363 | 3/1938 | Howells et al. | 252—135 |
| 2,154,977 | 4/1939 | Furness et al. | 252—135 |
| 3,007,877 | 11/1961 | Allen | 252—135 |
| 3,272,752 | 9/1966 | Hartlapp et al. | 252—135 |
| 3,446,742 | 5/1969 | Bacon | 252—135 X |
| 3,451,935 | 6/1969 | Roald et al. | 252—135 |
| 3,454,499 | 7/1969 | Meyer et al. | 252—135 X |

OTHER REFERENCES

Hackh's "Chemical Dictionary," 3rd ed. (1944), p. 549, McGraw-Hill Book Co., Inc., N.Y.

LEON D. ROSDOL, Primary Examiner

D. SILVERSTEIN, Assistant Examiner

U.S. Cl. X.R.

195—63